United States Patent [19]

Bolton

[11] Patent Number: 5,575,301
[45] Date of Patent: Nov. 19, 1996

[54] MOBILE SHELTER

[76] Inventor: Mark A. Bolton, 312 Cypress Creek Rd., Brandon, Miss. 39042

[21] Appl. No.: 509,229

[22] Filed: Jul. 31, 1995

[51] Int. Cl.$^6$ .................................................. E04H 15/34
[52] U.S. Cl. ........................ 135/122; 135/912; 135/124
[58] Field of Search ..................... 135/124, 122, 135/906, 908, 912, 115; 239/722, 225.1

[56] References Cited

U.S. PATENT DOCUMENTS

| | | | |
|---|---|---|---|
| 223,468 | 1/1880 | Benthall . | |
| 247,856 | 10/1881 | Taylor . | |
| 659,114 | 10/1900 | Voorhies . | |
| 1,128,558 | 2/1915 | Voorhies . | |
| 2,575,572 | 11/1951 | Wickstrum | 135/912 X |
| 2,603,171 | 7/1952 | Smith | 135/122 X |
| 2,693,195 | 11/1954 | Frieder et al. | 135/122 |
| 3,530,623 | 9/1970 | Burton | 135/122 X |
| 4,068,679 | 1/1978 | Pringle et al. . | |
| 4,136,826 | 1/1979 | Ausherman . | |
| 4,209,068 | 6/1980 | Corsentino . | |
| 4,763,836 | 8/1988 | Lyle et al. . | |
| 4,898,198 | 2/1990 | Castlebury . | |

FOREIGN PATENT DOCUMENTS

| | | | |
|---|---|---|---|
| 0018485 | 1/1985 | Japan | 135/122 |
| 0346997 | 7/1960 | Switzerland | 135/122 |

*Primary Examiner*—Lanna Mai
*Attorney, Agent, or Firm*—Phelps Dunbar

[57] ABSTRACT

A mobile shelter which provides a canopy that protects from sun and rain. The canopy is mounted on a series of curved rib units that are connected to a triangular support system which is attached at each end to A-Frame supports on wheels.

1 Claim, 4 Drawing Sheets

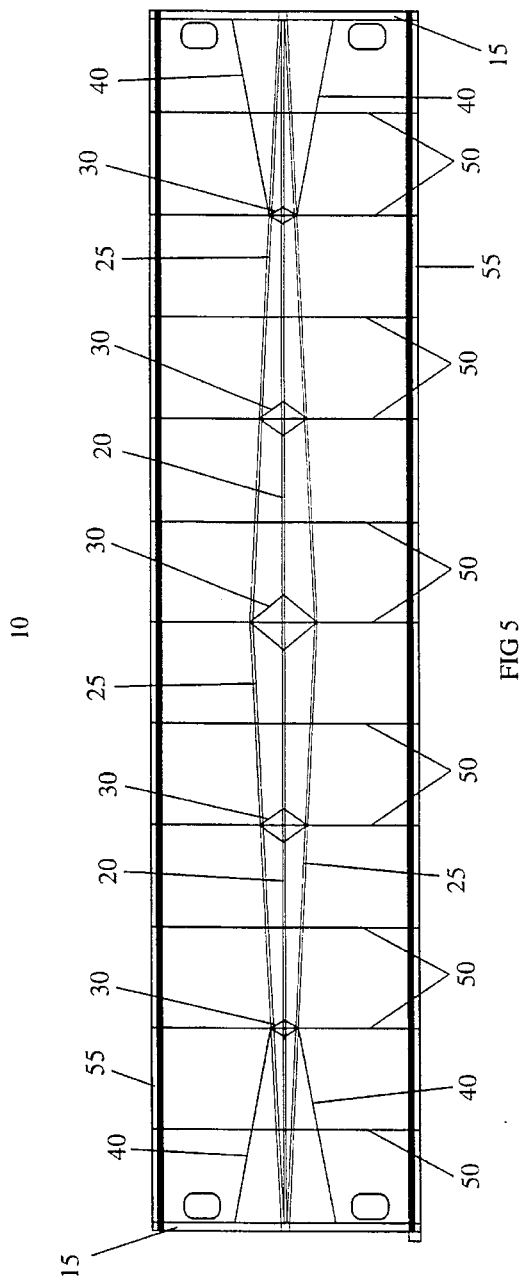
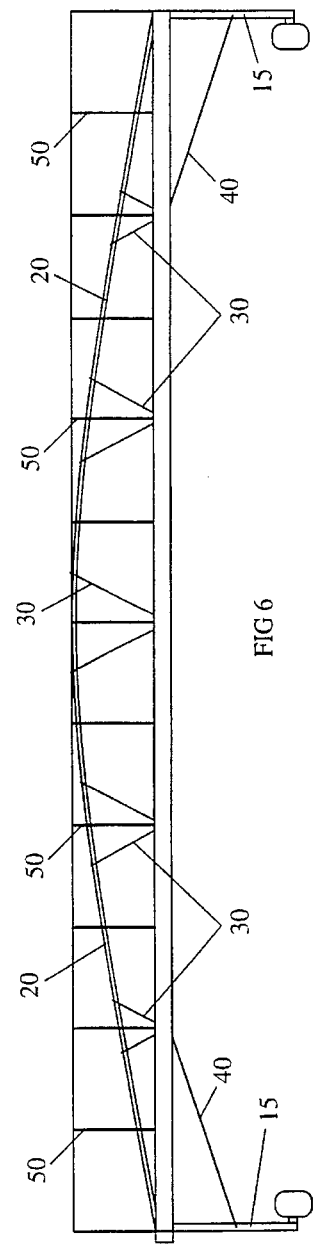
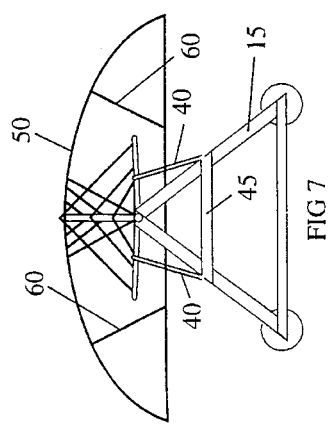

MOBILE SHELTER

BACKGROUND OF THE INVENTION

1. Field of the Invention

This invention relates to shelters for use in protecting people, animals, plants or any other items from the elements, including sun and rain, and specifically to such shelters that are mobile.

2. Description of Related Art

The prior art reveals mobile shelters, but only on a very small scale, such as for an individual agricultural worker. The prior art does not reveal a mobile shelter capable of protecting numerous people from the elements while involved in an outdoor activity, such as golf, archery or the like.

SUMMARY OF THE INVENTION

In accordance with the invention, a free-standing, self supporting, mobile structure is provided that supports a canopy of lightweight fabric. The fabric may block all or some portion of the rays of the sun, and may be totally or partially impervious to rainfall. The shelter can be provided in various lengths, up to 200 feet or more, and can provide sufficient clearance underneath the canopy for various activities, including golf or archery, for example. The width of the shelter is sufficient to adequately protect those underneath the shelter from sun and rain. The shelter is mounted on wheels, so that it is entirely mobile, and may be self propelled, or provide for easy connection to a tractor or other device for moving. The canopy may be retractable, either through the use of a motor-driven or manual system which pulls the canopy back to one side of the support structure.

BRIEF DESCRIPTION OF THE DRAWINGS

FIG. 5 is another top view of the support structure of the mobile shelter of the present invention;

FIG. 6 is another side view of the support structure of the mobile structure of the present invention;

FIG. 7 is another end view of the support structure of the mobile structure of the present invention;.

DETAILED DESCRIPTION OF THE DRAWINGS

Figure 1:
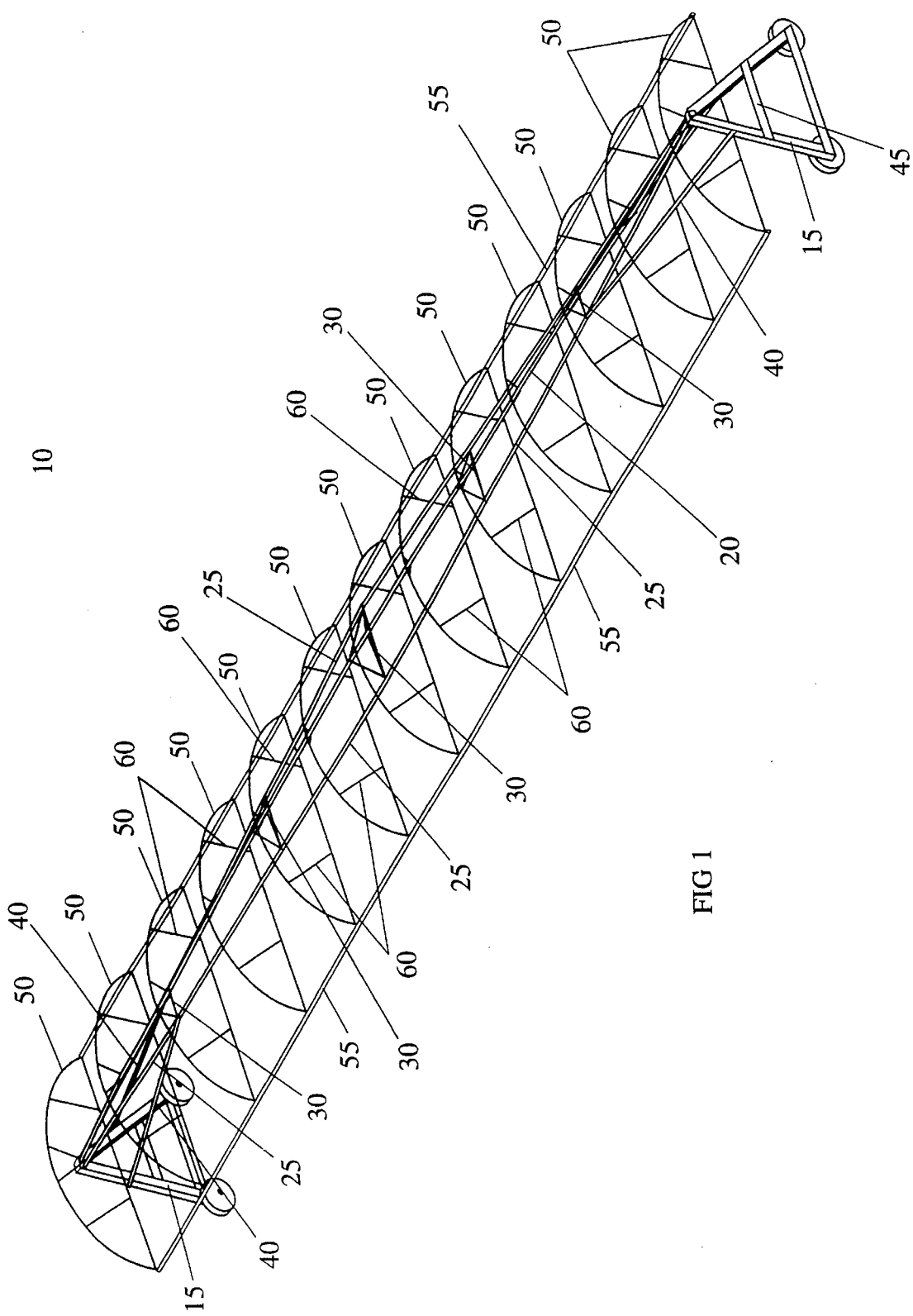
FIG. 1 is a perspective view of a mobile shelter without a canopy in place.
Figure 2:
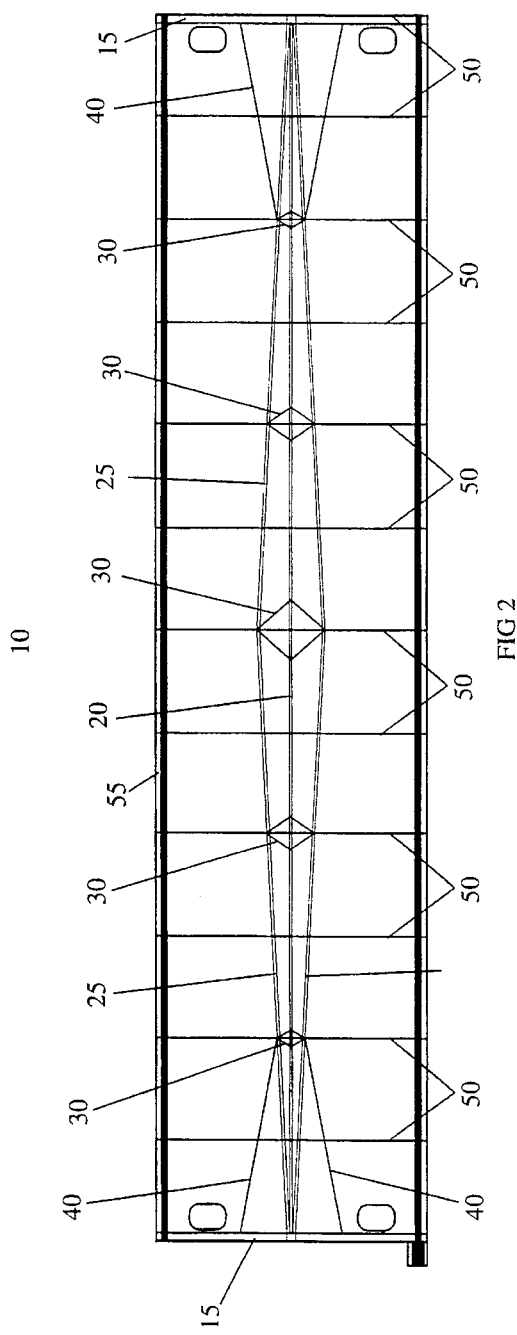
FIG. 2 is a top view of the support structure of the mobile shelter of the present invention.
Figure 3:
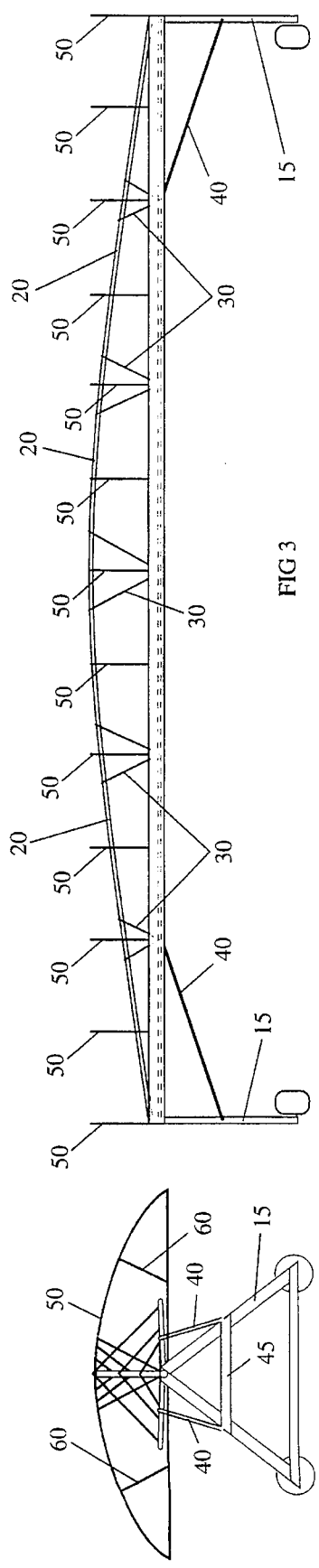
FIG. 3 is a side view of the support structure of the mobile structure of the present invention.
Figure 4:
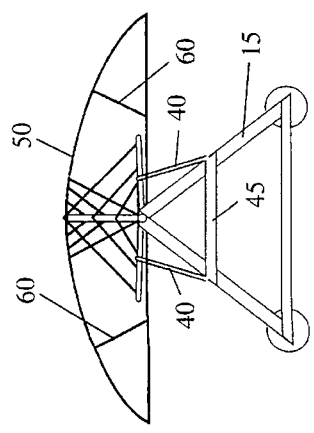
FIG. 4 is an end view of the support structure of the mobile structure of the present invention;.
Figure 8:
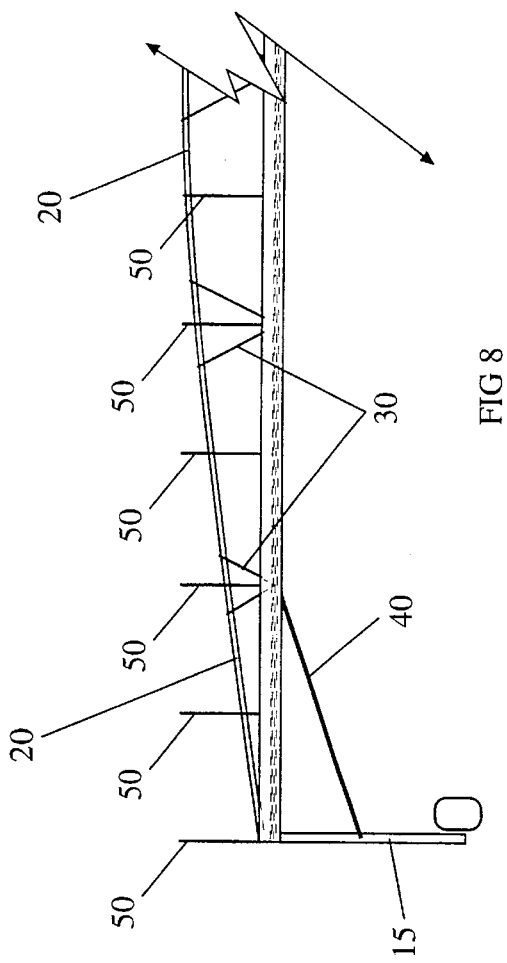
FIG. 8 is another side view of the support structure of the mobile structure of the present invention.
Figure 9:
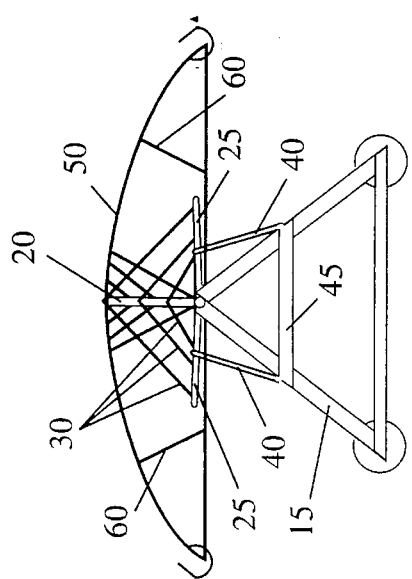
FIG. 9 is another end view of the support structure of the mobile structure of the present invention;.

FIG. 1 shows in perspective the mobile shelter (10). The shelter is supported on each end by an A-Frame structure with wheels (15). These end structures provide adequate clearance underneath the structure for such activities as golf. Clearance of 12 feet is typical of the height of this invention. As can be seen in FIG. 1, the two ends are connected by a long primary connecting member (20), which may be a variety of material, including six inch pipe. Six inch pipe provide adequate strength for the distances covered by the present invention (over 200 feet for some structures). In addition to the primary connecting member (20), two auxiliary connecting members (25) connect the two ends, and form a triangular cross section in conjunction with the primary connecting member (20), with the primary connecting member (20) being the upper most point of the triangular cross section, as best shown in FIGS. 4, 7, and 9. The triangular cross section is preferably isosceles in shape, and is gets progressively larger in area towards the mid-point of the span of the shelter (10). At intervals the primary (20) and auxiliary (25) connecting members are braced by bracing connector members (30) which connect the two auxiliary connecting members (25) to each other and to the primary connecting member (20). As can be seen from FIGS. 1 and 2, each auxiliary connecting member (25) may be attached to the primary connecting member (20) using two braces attached to the auxiliary connecting member (25) at generally the same place, but which connect to the primary connecting member (20) at points equidistant from the perpendicular plane which corresponds to the point of connection with the auxiliary connecting member (25). A preferred angle between the two bracing members is 75 degrees, which provides optimum support of the primary connecting member (20) by the two auxiliary connecting members (25). Bracing connector members (30) should be placed periodically over the entire span of the shelter structure (10). A preferred distance is a bracing structure every 20 feet. The two end structures (15), primary connecting member (20), two auxiliary connecting members (25), and periodic bracing structures (30) form the weight supporting portion of the mobile shelter (10). A stabilizer system may be added for additional strength. The stabilizer structure (35) is best seen in FIGS. 3, 6, and 8 and is attached to the A-Frame end structure (15) some distance down from the top of the A-Frame end structure (15). A preferred distance is approximately one-fourth of the distance down from the top of the end structure (15). A stabilizer bar (40) is connected to each leg of the A-frame structure (15), with the other end of each stabilizer bar (40) being connected to one of the auxiliary connecting members (25). It is preferred that the connection point be near or at the first bracing structure (30) connecting the primary connecting member (20) to the auxiliary connecting members (25). The stabilizer bars (40) may be made of a material such as 2 inch pipe where the primary connecting member (20) is 6 inch pipe. Note that the bracing structures (30) can be made from 2 inch angle iron. The A-frame legs may be made from 6 inch channel iron, or other suitable material. As part of the stabilizer system, a horizontal cross member (45) may be connected to each leg of the A-Frame end at or near the point of connection of the two stabilizer bars (40), as best seen in FIGS. 1, 4, 7, and 9.

The wheels of the mobile shelter should be of sufficient size to not only support the structure, but provide for easy movement over uneven terrain. Uses of the device suggest that movement of the structure in pastures and fields may be needed, requiring pneumatic tires of sufficient radius. For example, 24 inch by 12 inch tires will facilitate movement in most applications.

The canopy is placed over the canopy support rib units (50). These rib units are placed at intervals along the span of the mobile shelter (10), as best seen in FIG. 1. A preferred interval distance is every 10 feet. Each rib unit (50) is connected to the primary connecting member (20), and is parallel to the plane of the A-Frame end structures (15). In addition, each rib unit (50) is connected to two canopy cross bars (55). These cross bars (55) extend the length of the shelter and are located at the end of each rib unit (50). The rib units (50) may require internal bracing (60) to maintain integrity, as best seen in FIG. 1. It is preferred that the rib units (50) provide a curved consistent surface over which to stretch the canopy. One embodiment of the invention provides a mechanism for retracting the canopy by rolling it up toward one side of the shelter. This may be accomplished by use of a motor driven rod which is attached to the canopy and extends adjacent to one of the canopy cross bars. The rib units (50) may be sized to provide the needed area of protection. A preferred width provided by the rib units (50) is approximately 20 feet.

What I claim is:

1. A mobile shelter comprising;

two end support structures;

a plurality of wheels connected to said two end support structures;

a primary connecting member connecting said two end support structures to each other;

two auxiliary support members connecting said two end support structures to each other whereby said two auxiliary support members and said primary connecting member form a generally isosceles triangular cross section with said primary connecting member being the upper most point of the triangle;

a plurality of bracing structures connecting said primary connecting member and said two auxiliary support members at intervals along the length of said primary connecting member;

stabilizer bar systems connecting each of said two auxiliary support members to each of said two end support structures;

a plurality of rib units connected to said primary connecting member at intervals along the length of said primary connecting member, whereby said plurality of rib units lie in planes parallel to the plane of said two end support structures, and further wherein said plurality of rib units provide a curved support surface;

two canopy cross bar members which are connected to the ends of each of said plurality of rib units; and a canopy which is supported by said plurality of rib units.

\* \* \* \* \*